United States Patent
Fung et al.

(10) Patent No.: US 6,567,037 B1
(45) Date of Patent: May 20, 2003

(54) TRACKING DATA FUSION METHOD IN COMBINED RADAR/ADS SURVEILLANCE ENVIRONMENT

(75) Inventors: Youn-Tih Fung, Taipei (TW); Wu-Ja Lin, Taipei (TW); Yeong-Shiou Hsiao, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 10/026,644

(22) Filed: Dec. 27, 2001

(51) Int. Cl.[7] .............................................. G01S 13/00
(52) U.S. Cl. ........................... 342/29; 342/32; 342/36; 342/37
(58) Field of Search ........................... 342/26, 297, 32, 342/36, 37

(56) References Cited

U.S. PATENT DOCUMENTS

| | | | | |
|---|---|---|---|---|
| 5,321,406 A | * | 6/1994 | Bishop et al. | 342/32 |
| 5,381,140 A | * | 1/1995 | Kuroda et al. | 340/961 |
| 6,047,233 A | * | 4/2000 | Salvatore et al. | 345/846 |
| 6,133,867 A | * | 10/2000 | Eberwine et al. | 342/125 |
| 6,260,759 B1 | * | 7/2001 | Nguyen et al. | 235/411 |

* cited by examiner

Primary Examiner—Thomas H. Tarcza
Assistant Examiner—Brian Andrea
(74) Attorney, Agent, or Firm—Bacon & Thomas

(57) ABSTRACT

A tracking data fusion method used in a combined radar/ADS surveillance environment defines track states, track types, and track types transition rules to track aircraft. The best available flight services could be provided if the proposed method is used in an air traffic control system.

16 Claims, 1 Drawing Sheet

TRACKING DATA FUSION METHOD IN COMBINED RADAR/ADS SURVEILLANCE ENVIRONMENT

BACKGROUND OF THE INVENTION

1. Field of the Invention

The present invention can be classified to air traffic control, and particularly to a tracking data fusion method in combined radar/ADS surveillance environment.

2. Description of Related Art

As air traffic grows rapidly (about 10% per year), current air traffic control system cannot handle it efficiently. To solve the accompanying problems, e.g., rising operational cost and arrival time delay, the International Civil Aircraft Organization (ICAO) established a FANS (Future Air Navigation Systems) committee to study and propose new techniques. FANS proposed new Communication, Navigation, Surveillance (CNS) techniques in 1991 to support future Air Traffic Management (ATM). Among these techniques, ADS-A (Automatic Dependent Surveillance-Addressing) and ADS-B (Automatic Dependent Surveillance-Broadcast) are new techniques for Surveillance.

In the future, radars, ADS-A and ADS-B will be simultaneously used in the surveillance environment. Therefore, current air traffic control system, which only uses radars to track aircrafts, must be modified so that it can combine multiple surveillance data to track aircrafts in the new surveillance environment. The present invention provides a way to satisfy this requirement.

SUMMARY OF THE INVENTION

The object of the present invention is to provide a tracking data fusion method in combined radar/ADS surveillance environment. The proposed method defines (1) tracking states, such as initiated, established, tracked, coast, and terminated; (2) track types, such as search, beacon, accurate, ADS-accurate, ADS-beacon, and ADS; (3) track types transition rules. The proposed method can provide aircrafts the best available flight services in a combined radar/ADS surveillance environment.

The various objects and advantages of the present invention will be readily understood in the following detailed description.

DETAILED DESCRIPTION OF THE PREFERRED EMBODIMENTS

Figure 1:
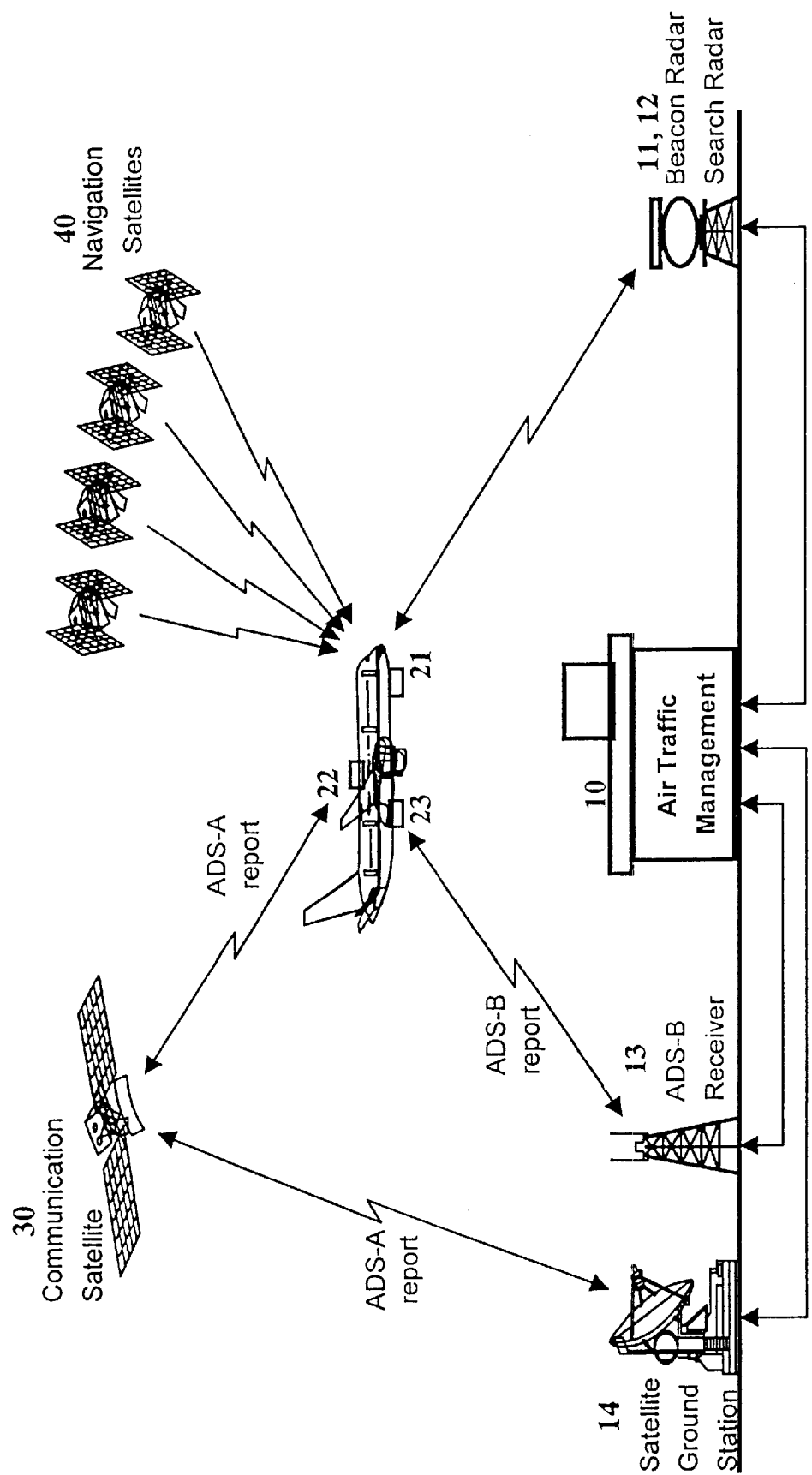
FIG. 1 depicts the combined radar and ADS surveillance environment.

In combined radar/ADS surveillance environment, as illustrated in FIG. 1, the following facilities are available:

(1) A primary radar station 11, which can transfer aircraft positions, etc. to an air traffic control center 10.

(2) A secondary radar station 12, which can transfer aircraft altitudes, beacon codes, etc. to an air traffic control center 10. In general, the primary radar station 11 and the secondary radar station 12 are set in the same place.

(3) An air traffic control center 10, which fuses various surveillance information and provides aircrafts various flight services.

(4) An ADS-B signal receiver station 13, which receives ADS-B data such as aircraft positions, altitudes, IDs, etc. and transfers them to the air traffic control center 10.

(5) A satellite signal receiver station 14, which receives ADS-A data from communication satellites 30.

In this combined radar/ADS surveillance environment, an aircraft is possibly equipped with the following devices:

(1) A beacon code transponder 21, which broadcasts the beacon code of an aircraft.

(2) An ADS-A device 22, which determines the aircraft position with navigation satellites 40, and sends ADS-A data to the air traffic control center 10 using communication satellites 30 and satellite ground station 14.

(3) An ADS-B device 23, which determines aircraft positions with navigating satellites 40, and broadcasts aircraft positions, altitudes, IDs, etc.

The present invention defines tracking states, track types, and track types transition rules to provide aircrafts the best available flight services in combined radar/ADS surveillance environment. Table 1 shows flight services available to aircrafts equipped with various facilities.

TABLE 1 flight services available to aircrafts equipped with variant devices

| Facility equipped in an aircraft | Separation service | Flight data processing service | Data link service |
| --- | --- | --- | --- |
| ADS-B device | 3 miles or lower | Yes | No |
| Beacon code transponder | 1. 3 miles separation in terminal environment<br>2. 5-mile separation in en-route environment | Yes | No |
| ADS-A device | 50-mile separation | Yes | CPDLC PDC D-ATIS |
| No | No separation service | No | No |

The tracking states defined in the present invention are (1) initiated: When a target do not correlate with any system track, this target initiates a new track. The newly initiated track's type is determined by the surveillance facility been used.

(2) established: when newly initiated track is updated for several times, the system will set this track established.

(3) Tracked: system continuously receives target reports of the system track. System will calculate this track's velocity and predict its position for safety management.

(4) coast: If a track do not receive target reports for a period of time, this track will be marked coast.

(5) terminated: If a track is coast and do not receive any target reports for an extended period of time, this track will be terminated. System saves information about the terminated track.

Tables 2 and 3 show the conditions to be met for various track states.

TABLE 2

Initiation and establishment conditions for various tracks:

| Track type | Initiation conditions | Establishment conditions |
|---|---|---|
| Beacon or search | Targets reported by primary or secondary radars do not correlate with existing tracks. | Track is established when receives three successive position reports. |
| Accurate | ADS-B target do not correlate with existing tracks. | Track is established when initiated. |
| ADS | ADS log-on or handed-off from other air traffic control center. | Track is established when initiated. |
| ADS search ADS beacon ADS accurate | transited from other track types | Directly stays in established state when transited from other track types |

TABLE 3

Coast and termination conditions for various tracks

| Track type | Coast conditions | Termination conditions |
|---|---|---|
| Search Beacon Accurate | Do not correlate with targets for three consecutive batch time (about 3 × 4.5 = 13.5 seconds). | 1. track is coast and do not correlate with targets for eight consecutive batch time (about 8 × 4.5 = 36 seconds).<br>2. Dropped by the controller |
| ADS | Do not correlate with ADS targets for two consecutive report cycles. | 1. ADS log-off<br>2. Track is handed off to other air traffic control center.<br>3. Dropped by the controller. |
| ADS search ADS beacon ADS accurate | Do not correlate with targets for three consecutive batch time about 3 × 4.5 = 13.5 seconds | Dropped by the controller. |

The track types listed in Column 1 of Tables 2 and 3 are determined by surveillance facilities system used. In combined radar/ADS surveillance environment, the surveillance facilities could be: primary radar, secondary radar, ADS-A, and ADS-B. A primary radar reported target will initiate a "Search" track. A secondary radar, ADS-B, or ADS-A reported target will initiate a "Beacon", "Accurate", or "ADS" track, respectively. Besides these four track types ("Search", "Beacon", "Accurate" and "ADS"), the present invention further defines "ADS-search", "ADS-beacon" and "ADS-accurate". When an "ADS" track correlates with a primary radar target, this track's type will transit from "ADS" to "ADS-search". Similarly, if an "ADS" track correlates with secondary radar or ADS-B reported targets, the track's type will transit from "ADS" to "ADS-beacon" or "ADS-accurate". The track-type transition rules are listed in Table 4. These rules are designed to make the best surveillance information be available to system.

TABLE 4

Condition for transiting track types

| From | To | Transition conditions |
|---|---|---|
| Search | Beacon ADS search | Controller commands |
| Beacon | Search | Controller commands |
| | Accurate | Correlate with a ADS-B target |
| | ADS beacon | Correlate with ADS-A target and the aircraft IDs are of the same |
| Accurate | Beacon | Do not correlate with ADS-B target and correlate with secondary radars reported targets |
| | ADS accurate | Correlate with ADS-A target and the aircraft IDs are of the same |
| ADS | ADS search | Controller commands |
| | ADS beacon | Correlate with beacon track and the aircraft IDs are of the same |
| | ADS accurate | Correlate with accurate track or ADS-B target and the aircraft IDs are of the same |
| ADS search | Search | log-off ADS-A service |
| | ADS | Do not correlate with primary radar reported targets for a period of time |
| | ADS beacon | Correlate with beacon track and the aircraft IDs are of the same |
| | ADS accurate | Correlate with accurate track or ADS-B target and the aircraft IDs are of the same |

TABLE 4-continued

Condition for transiting track types

| From | To | Transition conditions |
|---|---|---|
| ADS beacon | Beacon | log-off ADS-A service |
|  | ADS | Do not correlate with secondary radar reported targets for a period of time |
|  | ADS accurate | Correlate with ADS-B target and aircraft IDs are of the same |
| ADS accurate | Accurate | log-off ADS-A service |
|  | ADS | Do not correlate with ADS-B reported targets for a period of time |
|  | ADS beacon | Correlate with secondary radar reported targets and the aircraft IDs are of the same, and do not correlate with ADS-B target for a period of time |

In the following, we give an example to illustrate how an aircraft equipped with various facilities is tracked and how the track type transits from one to another. Suppose an aircraft equipped with a beacon code transponder 21 and an ADS-A device 22 flies in combined radar/ADS surveillance environment. When the aircraft 20 logs on the ADS-A service, the air traffic control system initiates a new track of type "ADS". As the aircraft continuously uses ADS-A to report its position, altitude, ID, etc., the air traffic control system 10 establishes this "ADS" track and provide it the corresponding flight services. When the aircraft enters secondary radars' 12 coverage, the air traffic control system 10 will receive the corresponding beacon target reports. Air traffic control system will then correlate the beacon target with the established "ADS" track if their aircraft IDs are of the same. Then the system transits the "ADS" track to "ADS-beacon".

When the aircraft flies for an extended period of time and leaves secondary radars' coverage, air traffic control system will not receive beacon target reports of this aircraft. The system will then transits "ADS-beacon" track back to "ADS".

When the aircraft flies for a further period of time, the pilot may request to log off ADS-A service. After log-off, the system terminates this track.

The above example describes that the present invention can track aircrafts with the best available surveillance information.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tracking data fusion method in a combined radar/ADS surveillance environment, comprising the steps of:
    defining tracking states including an initiated state, an established state, a tracked state, a coast state, and a terminated state;
    defining track types including a search track, a beacon track, an accurate track, an ADS-accurate track, an ADS-beacon track, an ADS-search track, and an ADS track;
    defining track types transition rules; and
    causing an air traffic control system to perform the following steps:
        initiating the search track, if the system receives a primary radar reported target and the primary radar reported target does not correlate with any existing system track;
        initiating the beacon track, if the system receives a secondary radar reported target and the secondary radar reported target does not correlate with any existing system track;
        initiating the accurate track, if the system receives an ADS-B reported target and the ADS-B reported target does not correlate with any existing system track,
        initiating the ADS track, if the system receives an ADS-A target and the ADS-A target does not correlate with any existing system track; and
        causing a controller to correlate initiated ADS and search tracks, and initiating the ADS-search track, if the system receives an aircraft's position from both a primary radar and ADS-A.

2. The method in claim 1, wherein when the air traffic control system initiates a new track, the new track's type is determined based on which surveillance devices are being used.

3. The method in claim 1, wherein when a track is in the tracked state, the air traffic control system will calculate its speed and predict its position to pre-alert any possible conflicts.

4. The method in claim 1, wherein when a track is in the coast state, the air traffic control system will calculate its speed and predict its position to pre-alert any possible conflicts.

5. The method in claim 1, wherein when a track is in the terminated state, the air traffic control system will store all information about the track that is in the terminated state.

6. The method in claim 1, wherein the air traffic control system initiates the ADS-beacon track, if the system receives an aircraft's position and aircraft IDs from both a secondary radar and ADS-A and the system identifies that the aircraft IDs are identical.

7. The method in claim 6, wherein the air traffic control system initiates the ADS accurate track, if the system receives an aircraft's position and aircraft IDs from both ADS-A and ADS-B and the system identifies that the aircraft IDs are identical.

8. The method in claim wherein 7, wherein (1) when the search or beacon track is initiated, the air traffic control system will mark the search or beacon track as established if the system further receives three consecutive primary or secondary target reports which correlate with the track; (2) when the accurate track is initiated, the air traffic control system will then mark the accurate track as established; and (3) when an ADS track is initiated, the air traffic control system will then mark the track as established.

9. The method in claim 8, wherein (1) if the search or beacon track does not correlate with targets for three consecutive batch times, the search or beacon track will be marked coast; (2) if a coast search or beacon track does not correlate with targets for an extended eight consecutive batch times, the coast search or beacon track will be terminated; and (3) if an ADS track is handed off or a pilot logs off ADS-A service, the ADS track will be terminated.

10. The method in claim 9, wherein the search track can be set to the beacon or ADS-search track by controller commands.

11. The method in claim 10, wherein the beacon track transits to (1) the search track, if the controller requires; (2) the accurate track, if the beacon track correlates with an ADS-B target and the aircraft IDs are identical; and (3) the ADS-beacon track, if the beacon track correlates with an ADS-A target and the aircraft IDs are identical.

12. The method in claim 11, wherein the accurate track is transited to the ADS-accurate track, if the accurate track correlates with an ADS-A target and the aircraft IDs are identical.

13. The method in claim 12, wherein the ADS track transits to (1) the ADS-search track, if the controller fuses it with the search track; (2) the ADS-beacon track, if the ADS track correlates with the beacon track and the aircraft IDs are identical; and (3) the ADS-accurate track, if the ADS track correlates with the accurate track and the aircraft IDs are identical.

14. The method in claim 13, wherein the ADS-search track transits to (1) the search track, if the aircraft logs off the ADS-A service; (2) the ADS track, if the ADS-search track does not correlate with primary radar reported targets for a period of time; (3) the ADS-beacon track, if the ADS-search track correlates with the beacon track and the aircraft IDs are identical; and (4) the ADS-accurate track, if the ADS-search track correlates with the accurate track and the aircraft IDs are identical.

15. The method in claim 14, wherein the ADS-beacon track transits to (1) the beacon track, if the aircraft logs of the ADS-A service; (2) the ADS track, if the ADS-beacon track does not correlate with secondary radar reported targets for a period of time; and (3) the ADS-accurate track, if the ADS-beacon track correlates with an ADS-B target and the aircraft IDs are identical.

16. The method in claim 12, wherein the ADS-accurate track transits to (1) the accurate track, if the aircraft logs of the ADS-A service; (2) the ADS track, if the ADS-accurate track does not correlate with an ADS-B target for a period of time; and (3) the ADS-beacon track, if the ADS-accurate track does not correlate with an ADS-B target for a period of time, and correlates with a beacon track having an identical aircraft ID.

* * * * *